Feb. 6, 1968    R. A. JOHNSON    3,367,056
CRADLE SUPPORT EXTENSION FOR SHORT CASTING ROD
Filed Sept. 21, 1965
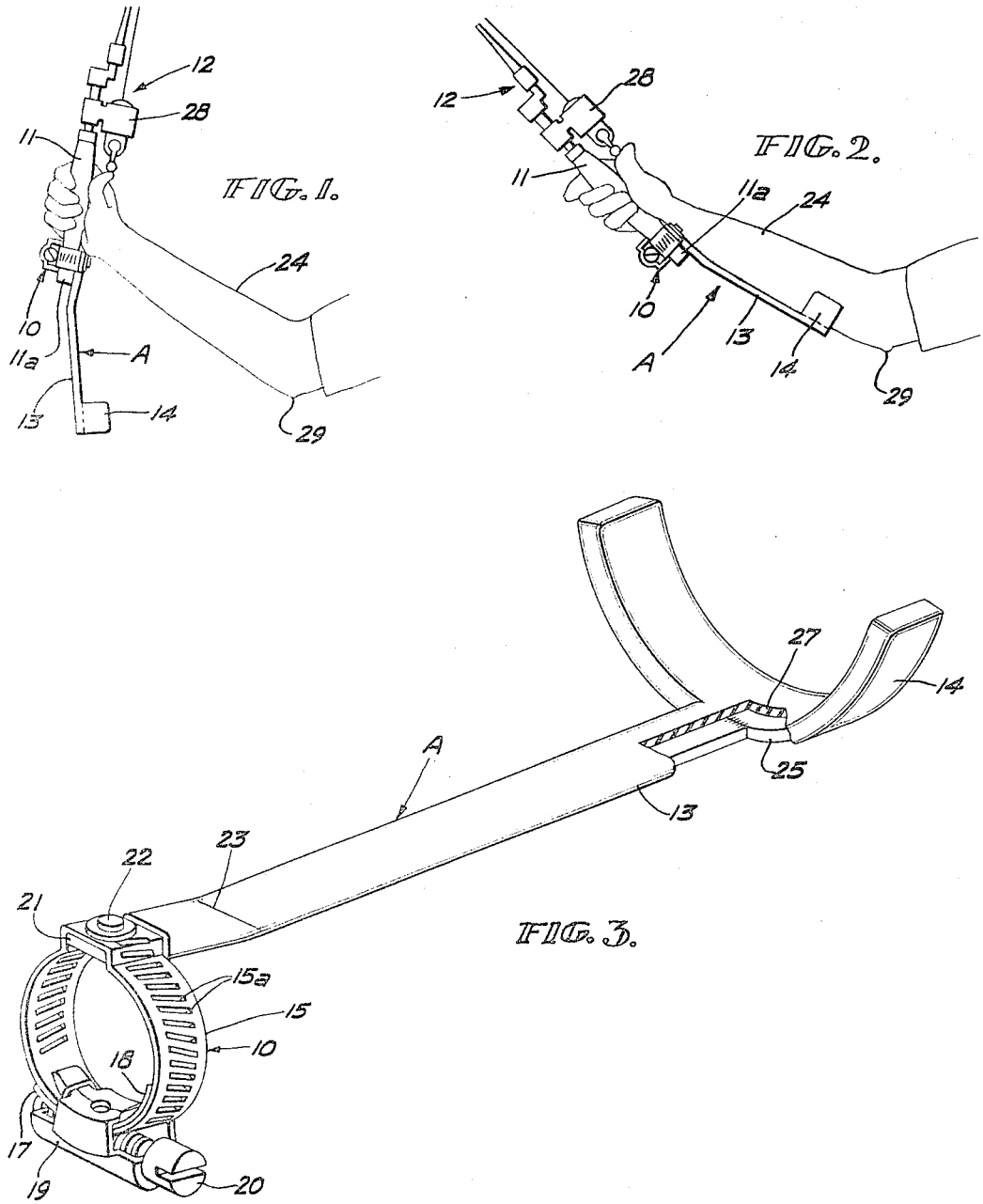
INVENTOR.
ROLLY A. JOHNSON
BY
Hansen and Lane
ATTORNEYS.

United States Patent Office 3,367,056
Patented Feb. 6, 1968

3,367,056
CRADLE SUPPORT EXTENSION FOR
SHORT CASTING ROD
Rolly A. Johnson, Box 388, Lucerne, Calif. 95458
Filed Sept. 21, 1965, Ser. No. 488,902
3 Claims. (Cl. 43—25)

ABSTRACT OF THE DISCLOSURE

An arm support for mounting on the handle of a short type bait casting rod, and of a length equal to a substantial portion of a user's forearm. A clamp on one end of the support arm clamps the support arm co-extensively onto the butt end of such rod so that the support arm extends beyond the butt end of the rod and beneath a user's forearm. A cradle for fitted support against the underside of a user's forearm is provided on the other end of the support arm, leaving the rod free to be raised for casting, but supported for still fishing, thereby relieving the wrist-activating muscles from the strain of supporting the rod.

---

The present invention relates to fishing rods, and pertains more particularly to an extension member for a short type bait casting rod which provides forearm support for the rod and relieves the wrist of the strain of supporting the rod while waiting for a bite, retrieving a cast, or playing a fish.

In the past, bait fishermen using a so-called "short" type of bait and casting rod have been faced with the necessity of using the muscles which control the action of the wrist for handling the rod at all times. While still fishing, during an extended period of casting, or while playing a fish, this can exert quite a strain on the wrist, and over a day's fishing is extremely tiring. With the so-called "long" rod the extension of the rod handle itself can be rested on the forearm, so that in that case the rod itself provides the necessary support, and permits the stronger biceps muscles to be used, particularly when playing a large fish.

An object of the present invention is to provide an extension for mounting on the butt of the handle of a short type bait fishing rod, the extension being bent at a slight angle to place the hand and wrist in an unstrained angle, and with a cradle support on the outer end of the extension to fit beneath the forearm of a user to transfer stresses from the wrist muscles to the biceps.

Another object of the invention is to provide an improved, removable cradle extension for mounting on a short type bait casting rod.

The foregoing objects and advantages of the invention will be apparent from the following description and the accompanying drawings, wherein:

FIG. 1 is a side elevational view showing a portion of the arm of a fisherman using a rod having a cradle forearm support extension thereon embodying the present invention.

FIG. 2 is a view similar to FIG. 1 as the parts would appear during the terminal portion of a cast, while still fishing, or while hooking or playing a fish.

FIG. 3 is an enlarged, perspective view of the cradle extension shown in FIGS. 1 and 2, a portion of the resilient sheath being broken away to show the internal structure.

Briefly, an illustrative embodiment 1 of the invention comprises a rod handle extension A, comprising a clamp 10 on its forward end of a size to encircle and grip the butt end portion 11a of the handle 11 of a short type bait casting fishing rod 12. A support arm 13 is secured to the clamp 10 and a transverse, curved forearm cradle member 14 is mounted on the rear end of the support arm 13.

Referring to the drawings in greater detail, the illustrative clamp 10 is a well-known type of hose clamp, with inclined, thread slots 15a cut in an encircling band 15. The band 15 has overlapping end portions 17 and 18 which fit into opposite ends of a screw supporting, enclosing sleeve 19. A screw 20, having an Acme type thread, is rotatably mounted in the sleeve 19, and is positioned therein so that the threads of the screw ride in, and threadly engage, the slots 15a in the outermost, overlapping end portion 17 of the encircling band 15. The inner end portion 18 of the band 15 is anchored to the inner side of the sleeve 19. To tighten the band 15, the screw 20 is turned in a direction to move the outer overlapping end portion 17 of the band further into the sleeve 19.

An offset 21 is provided in the upper portion of the clamp band 15 to fit over the forward end portion of the support arm 13, which is secured in place therein by a rivet 22. The support arm 13 is of metal of suitable strength, for example, spring steel, and has a slight bend 23 therein in a position to lie just rearwardly of the butt end of a short type fishing rod handle 11 when mounted thereon.

This bend 23 may be of the order to ten degrees, which provides a comfortable wrist angle as shown in FIG. 2 when the cradle 14 is in engagement with the forearm 24 of a fisherman using the rod. This bend angle, however, is not critical, and may be varied as desired to suit a user of the invention.

The cradle 14 comprises a cross band or strap 25 of suitable material secured T-fashion transversely across the rear end of the support arm 13, and is curved concavely upwardly as best shown in FIG. 3 to fit comfortably beneath an average man's forearm 24 when in the relative position shown in FIG. 2. The cradle band 25 may be of the same material as the support arm 13. However, it need not be as strong as the support arm, and may, if preferred, be of a more easily bendable material, such as, for example, hot or cold rolled steel band, to permit a user of the invention to either widen or restrict its curvature to fit his own forearm.

The support arm 13 and cradle band 25 preferably are enclosed within a cushioning layer 27 of a material of low thermal conductivity, for example, rubber, so that the metal of the support arm 13 and cradle band 25 will not chafe a user's forearm, chill it on a cold day, or burn it if the support is left exposed to the hot summer sun.

In using the illustrative form of the invention, to mount the cradle support extension A on a short type bait casting rod 12, the clamp band 15 is enlarged as required by turning the screw 20 in the required direction, and the clamp 10 is then fitted onto the butt end portion 11a of the rod handle 11. The clamp screw 20 is turned in the opposite direction to securely tighten the clamp 10 onto the butt end portion 11a of the rod handle with the concave side of the forearm cradle 14 on the same side of the rod handle 11 as the reel 28.

The fishing rod 12, with the cradle support A thus securely mounted thereon, is then ready to use, and is used in all respects in the same manner as without the support, with the exception that as will be noted in FIG. 2, when it is desired to raise or support the tip end of the rod, or if it is desired to support the rod for an extended period in the position shown in FIG. 2, the cradle 14 will rest comfortably in interfitted relation on the under side of the forearm 24 near the elbow 29 of the user, so that the rod and forearm are thus supported as a single element.

The support arm 13, being preferably of spring stock, also provides an additional element of resilience in the play of the fish, which reduces the chance of rod or tackle failures. When it is desired to exert a substantial lifting force on the rod tip, this force can be exerted by the biceps muscles, which, of course, are must stronger than the wrist control muscles.

The invention provides a simple, inexpensive cradle support extension for removably mounting on a short type bait casting rod, and one which can be easily and quickly attached and detached as desired. It is of a size to fit readily into the average tackle box, and eliminates the need for a large part of the usual tiring wrist manipulation of such a rod when not equipped with the invention.

While I have illustrated and described a preferred embodiment of the present invention, it will be understood, however, that various changes and modifications may be made in the details thereof without departing from the scope of the invention as set forth in the appended claims.

I claim:

1. A cradle forearm support for a short type bait casting rod having a handle with a grip portion and a butt end portion, and comprising, a clamp for mounting securely on the butt end portion of the handle of a short type bait casting fishing rod, a rigid support arm secured to one side of the clamp for clamping in close adjacent supported relation to the butt portion of the handle of such a rod and extending rearwardly endwise beyond the butt end of such rod when mounted thereon a distance equal to a substantial portion of a user's forearm, and a cradle member mounted on the opposite end of the support member from the clamp, and extending transversely of the support member, the cradle member being curved concavely on a radius to fit beneath a user's forearm.

2. A cradle forearm support for a short type bait casting rod as claimed in claim 1 wherein the clamp is an annular hose clamp and the support arm is gripped between the clamp and the butt end portion of the rod handle.

3. A cradle forearm support for a short type bait casting rod as claimed in claim 1 wherein the support arm and cradle are sheathed in a layer of cushioning material of low thermal conductivity.

References Cited

UNITED STATES PATENTS

| | | | |
|---|---|---|---|
| 774,143 | 11/1904 | Adams | 224—28 |
| 2,212,212 | 8/1940 | Planitz | 43—25 X |
| 2,244,408 | 6/1941 | Thompson | 43—25 |
| 2,482,589 | 9/1949 | Maguire | 224—28 X |

SAMUEL KOREN, *Primary Examiner.*

D. J. LEACH, *Assistant Examiner.*